(12) United States Patent
Cuenca et al.

(10) Patent No.: US 10,756,628 B2
(45) Date of Patent: Aug. 25, 2020

(54) SWITCHED MODE POWER SUPPLY CIRCUIT

(71) Applicant: STMicroelectronics (Rousset) SAS, Rousset (FR)

(72) Inventors: Michel Cuenca, Septemes les Vallons (FR); Cedric Thomas, Aix-en-Provence (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 16/407,425

(22) Filed: May 9, 2019

(65) Prior Publication Data

US 2019/0372460 A1 Dec. 5, 2019

(30) Foreign Application Priority Data

May 29, 2018 (FR) ...................................... 18 70616

(51) Int. Cl.
*H02M 3/158* (2006.01)
*H02M 1/00* (2006.01)
(52) U.S. Cl.
CPC .... *H02M 3/158* (2013.01); *H02M 2001/0045* (2013.01)

(58) Field of Classification Search
CPC ................................................... H02M 3/158
See application file for complete search history.

(56) References Cited

U.S. PATENT DOCUMENTS

| 7,202,653 | B2 | 4/2007 | Pai | |
|---|---|---|---|---|
| 2008/0122416 | A1* | 5/2008 | Cowell | ...... G05F 1/56 323/280 |
| 2009/0289720 | A1* | 11/2009 | Takinami | ............... G05F 1/565 330/297 |
| 2015/0008871 | A1 | 1/2015 | Petenyi | |
| 2016/0020696 | A1* | 1/2016 | Shibata | ................. H02M 3/156 323/268 |
| 2016/0291618 | A1* | 10/2016 | Wismar | .................. G05F 1/575 |
| 2016/0334818 | A1* | 11/2016 | Singh | ........................ G05F 1/56 |

FOREIGN PATENT DOCUMENTS

JP 2004280704 A 10/2004

* cited by examiner

*Primary Examiner* — Jue Zhang
*Assistant Examiner* — Trinh Q Dang
(74) *Attorney, Agent, or Firm* — Slater Matsil, LLP

(57) ABSTRACT

An electronic circuit includes a switched-mode power supply powering a first load via a first linear voltage regulator. The first regulator includes a transistor. The substrate and the gate of the transistor are capable of being coupled to a node of application of a power supply voltage. A method of operating the circuit is also disclosed.

26 Claims, 2 Drawing Sheets

SWITCHED MODE POWER SUPPLY CIRCUIT

CROSS-REFERENCE TO RELATED APPLICATIONS

This application claims priority to French Patent Application No. 1870616, filed on May 29, 2018, which application is hereby incorporated herein by reference.

TECHNICAL FIELD

The present disclosure concerns electronic circuits, and more particularly circuits comprising switched-mode power supplies.

BACKGROUND

Switched-mode power supplies are DC/DC converters which incorporate one or a plurality of switching elements. Like the other types of power supplies, switched-mode power supplies transfer a power supplied by a DC source to a load, modifying the current and/or voltage characteristics.

SUMMARY

An embodiment provides an electronic circuit comprising a switched-mode power supply powering a first load via a first linear voltage regulator. The first regulator comprises a transistor. The substrate and the gate of the transistor are capable of being coupled to a node of application of a power supply voltage.

According to an embodiment, the first load comprises logic circuits.

According to an embodiment, the switched-mode power supply directly powers a second load.

According to an embodiment, the second load comprises a radio frequency signal transmit and/or receive circuit.

According to an embodiment, the transistor is connected, by the source and the drain, between the output of the switched-mode power supply and the input of the first load. The transistor is controlled by an operational amplifier receiving as an input a reference voltage and the input voltage of the first load.

According to an embodiment, the substrate of the transistor is capable of being connected to the node of application of the power supply voltage or to the output of the switched-mode power supply.

According to an embodiment, the circuit comprises an operating state where the substrate of the transistor is connected to the output of the switched-mode power supply, the gate of the transistor is not connected to the node of application of the power supply voltage, and the second load is operating.

According to an embodiment, the circuit comprises an operating state where the substrate and the gate of the transistor are connected to the node of application of the power supply voltage and the second load is off.

According to an embodiment, the circuit comprises a second linear voltage regulator in series with a switch, coupled between the node of application of the power supply voltage and the input of the first load.

The foregoing and other features and advantages will be discussed in detail in the following non-limiting description of specific embodiments in connection with the accompanying drawings.

DETAILED DESCRIPTION OF ILLUSTRATIVE EMBODIMENTS

Figure 1:
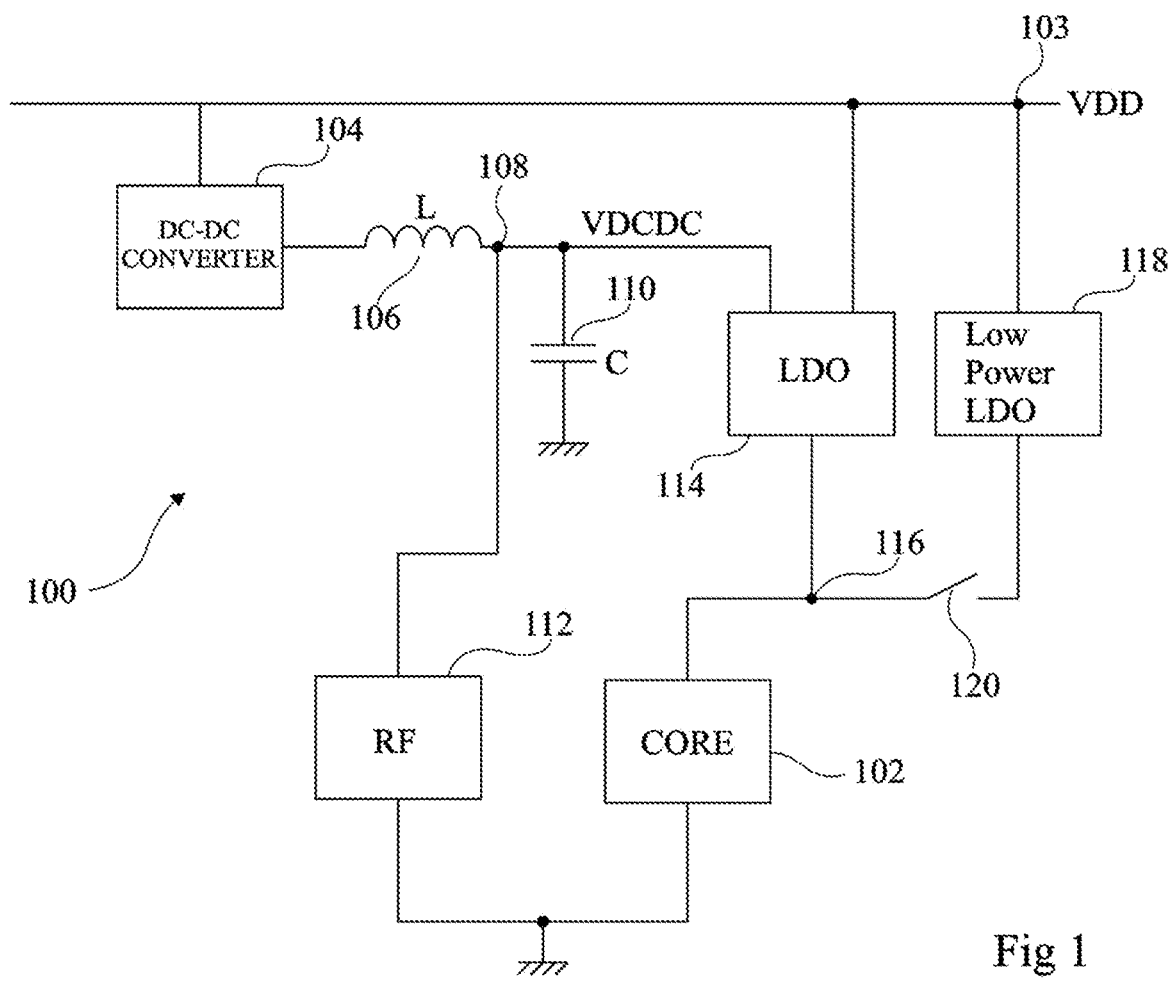
FIG. 1 is a simplified representation of an embodiment of a circuit.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed.

Unless otherwise specified, throughout the present disclosure, the term "connected" is used to designate a direct electrical connection between circuit elements, whereas the term "coupled" is used to designate an electrical connection between circuit elements that may be direct, or may be via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred to the orientation of the drawings.

Unless otherwise specified, the terms "approximately", "substantially", and "in the order of" are used herein to designate a tolerance of plus or minus 10%, preferably of plus or minus 5%, of the value in question.

FIG. 1 is a simplified representation of an embodiment of an electronic circuit 100.

Circuit 100 comprises a first load, for example, a circuit 102 (CORE). Circuit 102 for example comprises logic elements, for example, a microprocessor and memories.

Circuit 100 further comprises a switched-mode power supply 104 (DC-DC CONVERTER). Switched-mode power supply 104 is connected at its input to a node 103 of application of a power supply voltage VDD and, at its output, to a first terminal of an inductance 106 (L). The second terminal of inductance 106 is connected to a node 108. The voltage on node 108 is a voltage VDCDC supplied by switched mode power supply 104. Node 108 is coupled to ground by a capacitor 110 (C).

Circuit 10 may further comprise a second load, for example, a radio frequency (RF) signal transmit/receive circuit 112 (i.e., a circuit that can transmit, receive or both transmit and receive RF signals). Circuit 112 is connected between node 108 and the ground and is powered by switched-mode power supply 104.

Circuit 100 further comprises a linear voltage regulator 114 (LDO). Regulator 114 is connected, at its input, to node 108 (voltage VDCDC) and to node 103 of application of voltage VDD, and at its output to a node 116. An embodiment of regulator 114 is described in further detail in relation with FIG. 2.

Circuit 102 is connected between node 116 and the ground. Circuit 102 is thus powered by switched-mode power supply 104 in series with regulator 114.

Circuit 100 may comprise another linear voltage regulator 118 (LOW POWER LDO) intended for a low-power operating mode. Regulator 118 is coupled between node 103 of application of voltage VDD and a first terminal of a switch 120. The second terminal of switch 120 is connected to node 116.

In a first operating mode, switched-mode power supply 104 is operating. Switched-mode power supply 104 powers circuit 112 directly and circuit 102 via regulator 114. Further, switch 120 is off. Regulator 118, which may or not be operating, thus has no influence on circuit 100.

In a second so-called "low-power" operating mode, switched-mode power supply 104 and regulator 114 are not operating, as well as circuit 112, which is not powered. Switch 120 is on and regulator 118 is operating, which enables to power at least part of the elements of circuit 102.

In a third so-called "standby" operating mode, circuit 112 is absent or off and switch 120 is off. Switched-mode power supply 104 and regulator 114 are not operating. Circuit 102 is not powered.

Regulator 118 is configured to supply a relatively low power as compared with the power supplied by regulator 114, for example, sufficient to power part of the elements of circuit 102, typically in stand-by mode. Regulator 118 is for example configured to be able to power volatile memories comprised within circuit 102.

Figure 2:
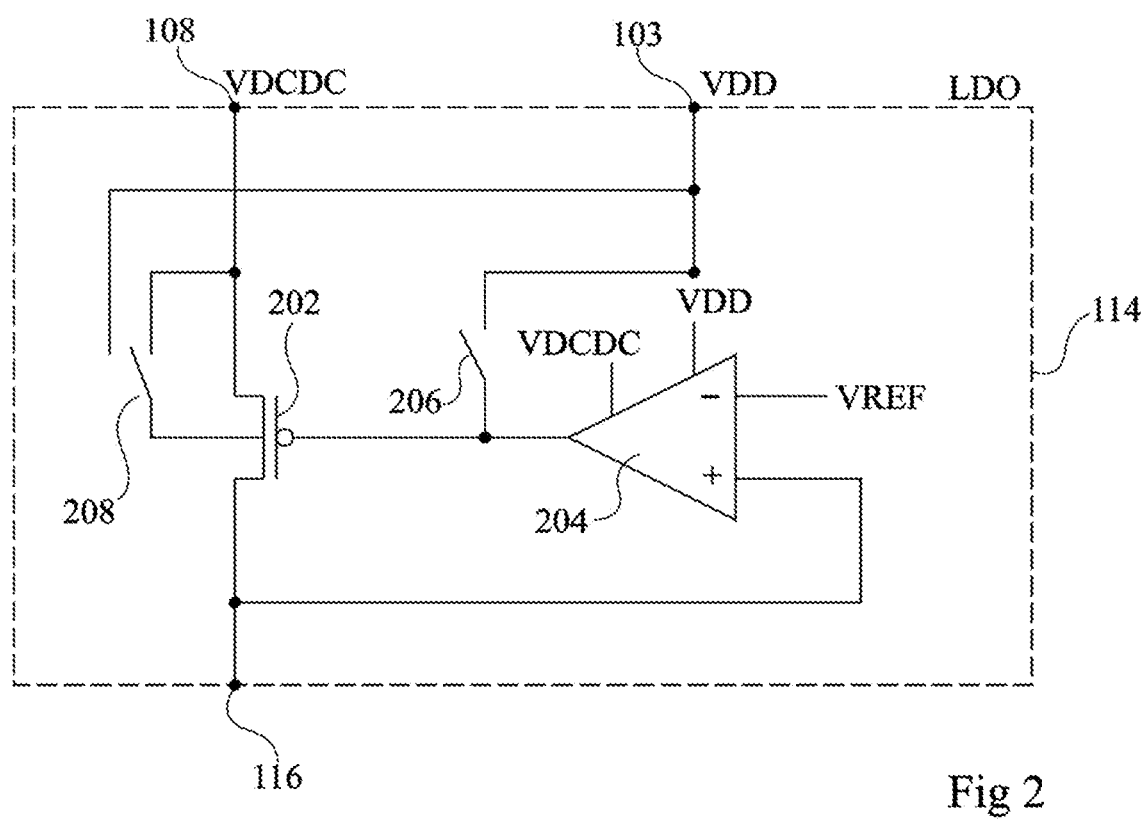
FIG. 2 is a more detailed simplified representation of an element of the circuit of FIG. 1.

FIG. 2 is a more detailed simplified representation of an embodiment of linear regulator 114. Regulator 114 comprises two inputs, connected, as in FIG. 1, to node 103 of application of power supply voltage VDD and to node 108. Regulator 114 further comprises an output connected to node 116.

The regulator comprises a transistor 202 connected between terminals 116 and 108. Transistor 202, for example, a PMOS-type transistor, is controlled by an operational amplifier 204. Operational amplifier 204 is powered with voltages VDD and VDCDC. The positive (+) and negative (−) inputs of the operational amplifier are respectively connected to node 116 and to a node of application of a reference voltage VREF, for example, lower than VDCDC.

Regulator 114 comprises a switch 206 coupling the gate of the transistor (the output of operational amplifier 204) to node 103 of application of voltage VDD. The gate of transistor 202 may thus be connected or not to node 103 of application of voltage VDD and voltage VDD may be applied or not to the gate of transistor 202.

Regulator 114 may further comprise a switch 208 coupling the substrate of transistor 202 either to node 103 of application of voltage VDD, or to node 108. Thus, the voltage applied to the substrate of transistor 202 may be either voltage VDCDC, or voltage VDD.

It may be chosen to connect linear voltage regulator 114 in parallel with switched-mode power supply 104, that is, between node 103 of application of voltage VDD and node 108 forming the output of the switched-mode power supply. Circuit 102 would then be connected in parallel with circuit 112 between node 108 and the ground.

However, the noise generated by switched-mode power supply 104 would then risk being transmitted to circuit 112 via a substrate common to circuits 112 and 102. Indeed, circuit 112 is configured to only reject the noise directly reaching it from node 108 and is thus sensitive to noise transmitted by circuit 102.

During the first previously-described operation mode, where circuits 102 and 112 are powered by switched mode power supply 104 and regulator 114, switch 206 is off and switch 208, if present, couples the substrate of transistor 202 to node 108. Thus, the noise generated by switched-mode power supply 104 is not transmitted to node 116 and it thus not transmitted to the common substrate of circuits 112 and 102.

During the second so-called "low-power" operating mode, switch 206 is on and switch 208 couples the substrate of the transistor to node 103 of application of voltage VDD. Thus, voltage VDD is applied to the substrate and to the gate of transistor 202. This enables to avoid current leakages between node 108 and node 116. This thus enables to avoid discharging capacitor 110 during this operating mode. Indeed, transistor 202 is off and the gate/source and gate/drain voltages of transistor 202 are negative, and thus the leakages between the drain and the source are negligible.

Various embodiments and variations have been described. These various embodiments and variations may be combined and other variations will occur to those skilled in the art.

Finally, the practical implementation of the described embodiments and variations is within the abilities of those skilled in the art based on the functional indications given hereinabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit comprising:
   a switched-mode power supply;
   a first load; and
   a first linear voltage regulator, wherein the switched-mode power supply is configured to power the first load via the first linear voltage regulator, the first linear voltage regulator comprising a transistor having a substrate and a gate that are selectively coupled to a power supply voltage node; and
   wherein the substrate of the transistor is switchable between the power supply voltage node and an output of the switched-mode power supply.

2. The circuit of claim 1, wherein the first load comprises logic circuits.

3. The circuit of claim 1, further comprising a second load, wherein the switched-mode power supply is coupled to directly power the second load.

4. The circuit of claim 1, wherein the transistor has a current path coupled between an output of the switched-mode power supply and the first load.

5. The circuit of claim 1, further comprising a second linear voltage regulator in series with a switch, the second linear voltage regulator and the switch coupled between the power supply voltage node and the first load.

6. The circuit of claim 3, wherein the second load comprises a radio frequency signal transmit/receive circuit.

7. The circuit of claim 3, wherein the circuit is configured to operate in a first operating state where the substrate of the transistor is connected to an output of the switched-mode power supply, the gate of the transistor is not connected to the power supply voltage node, and the second load is operating.

8. The circuit of claim 3, wherein the circuit is configured to operate in an operating state where the substrate and the gate of the transistor are connected to the power supply voltage node and the second load is off.

9. The circuit of claim 4, further comprising an operational amplifier having an output coupled to the gate of the transistor.

10. The circuit of claim 5, wherein the second linear voltage regulator comprises a low power linear voltage regulator.

11. The circuit of claim 7, wherein the circuit is configured to operate in a second operating state where the substrate and the gate of the transistor are connected to the power supply voltage node and the second load is off.

12. The circuit of claim 9, wherein the operational amplifier has a first input coupled to a reference voltage node and a second input coupled to the first load.

13. A circuit comprising:
a power supply voltage node;
a switched-mode power supply;
a first load;
a second load coupled to an output of the switched-mode power supply at a switched-mode power supply node; and
a first linear voltage regulator having an output coupled to the first load, wherein the first linear voltage regulator comprises:
an operational amplifier;
a transistor having a gate coupled to an output of the operational amplifier;
a first switch with a current path coupled between the power supply voltage node and the gate of the transistor; and
a second switch with a first terminal coupled to a body of the transistor, the second switch having a second terminal switchable between the power supply voltage node and an output of the switched-mode power supply.

14. The circuit of claim 13, wherein the switched-mode power supply is configured to power the first load via the first linear voltage regulator and wherein the switched-mode power supply is coupled to directly power the second load.

15. The circuit of claim 13, wherein:
the circuit is configured to operate in a first operating state where the body of the transistor is connected to the output of the switched-mode power supply, the gate of the transistor is not connected to the power supply voltage node, and the second load is operating; and
the circuit is configured to operate in a second operating state where the body and the gate of the transistor are connected to the power supply voltage node and the second load is off.

16. The circuit of claim 13, wherein the operational amplifier has a first input coupled to a reference voltage node and a second input coupled to the first load.

17. The circuit of claim 13, further comprising a second linear voltage regulator in series with a third switch, the second linear voltage regulator and the third switch coupled between the power supply voltage node and the first load.

18. A method of operating a circuit that comprises a switched-mode power supply, a first load, a second load coupled to the switched-mode power supply, and a first linear voltage regulator coupled between the switched-mode power supply and the first load, the first linear voltage regulator comprising a transistor having a substrate and a control terminal that are selectively coupled to a power supply voltage node, the method comprising:
operating the circuit in a first operating state where the substrate of the transistor is connected to an output of the switched-mode power supply, the control terminal of the transistor is not connected to the power supply voltage node, and the second load is operating; and
operating the circuit in a second operating state where the substrate and the control terminal of the transistor are connected to the power supply voltage node and the second load is off.

19. The method of claim 18, wherein the control terminal of the transistor is driven by an operational amplifier in the first operating state.

20. A circuit comprising:
a switched-mode power supply; and
a first linear voltage regulator comprising a first input coupled to a power supply voltage node, a second input coupled to an output of the switched-mode power supply, and an output coupled to a first load, wherein the switched-mode power supply is configured to power the first load via the first linear voltage regulator, the first linear voltage regulator comprising a transistor having a substrate selectively coupled to the first input and a gate selectively coupled to the first input, wherein the substrate of the transistor is switchable between the power supply voltage node and the output of the switched-mode power supply.

21. The circuit of claim 20, wherein the switched-mode power supply is coupled to directly power a second load.

22. The circuit of claim 20, wherein the transistor has a current path coupled between an output of the switched-mode power supply and the first load.

23. The circuit of claim 20, further comprising a second linear voltage regulator in series with a switch, the second linear voltage regulator and the switch coupled between the power supply voltage node and the first load.

24. The circuit of claim 21, wherein the first load comprises logic circuits, and wherein the second load comprises a radio frequency signal transmit/receive circuit.

25. The circuit of claim 21, wherein the circuit is configured to operate in an operating state where the substrate and the gate of the transistor are connected to the power supply voltage node and the second load is off.

26. The circuit of claim 22, further comprising an operational amplifier having an output coupled to the gate of the transistor.

* * * * *